United States Patent [19]
Tsugita et al.

[11] Patent Number: 5,396,288
[45] Date of Patent: Mar. 7, 1995

[54] IMAGE PROCESSING APPARATUS AND METHOD, AND VIDEO CAMERA

[75] Inventors: Makoto Tsugita, Asaka; Kazuyuki Masukane, Miyagi, both of Japan

[73] Assignee: Fuji Photo Film Co., Ltd., Kanagawa, Japan

[21] Appl. No.: 92,798

[22] Filed: Jul. 19, 1993

[30] Foreign Application Priority Data

Aug. 21, 1992 [JP] Japan .................. 4-243993

[51] Int. Cl.$^6$ ............................................. H04N 5/235
[52] U.S. Cl. ..................... 348/229; 348/300; 348/255
[58] Field of Search ............... 358/160, 166, 209, 228, 358/213.19; H04N 5/235; 382/50; 348/364, 365, 362, 366, 370, 294, 300, 229, 230, 254, 255, 28

[56] References Cited

U.S. PATENT DOCUMENTS

| | | | |
|---|---|---|---|
| 4,635,126 | 1/1987 | Kinoshita | 348/229 |
| 4,797,745 | 1/1989 | Westell | 358/166 |
| 4,962,426 | 10/1990 | Naoi et al. | 358/166 |
| 5,014,120 | 5/1991 | Numakura et al. | 358/37 |
| 5,247,360 | 9/1993 | Kawada et al. | 358/166 |

FOREIGN PATENT DOCUMENTS 5064070A 3/1993 Japan ............... H04N 5/235

Primary Examiner—James J. Groody
Assistant Examiner—Jeffrey S. Murrell

[57] ABSTRACT

A suitable image signal is obtained even with regard to a subject exhibiting a very large difference in luminance between bright and dark areas. A video signal obtained from a CCD by imaging the subject is amplified by a first amplifier, converted into digital image data A by a first A/D converter and then stored in a first memory. The video signal from the CCD is also amplified by first and second amplifiers, converted into image data B by a second A/D converter and then stored in a second memory. The amplification factor of the first second amplifier is set such that a comparatively dark area of the image of the subject will assume a level having an appropriate brightness. A multiplexer selects data representing a comparatively bright area of the image of the subject from image data read out of the first memory as well as data representing a comparatively dark area of the image of the subject from image data read out of the second memory. The selected items of data are combined (by inlay synthesis) to obtain image data representing an image exhibiting overall brightness.

24 Claims, 7 Drawing Sheets

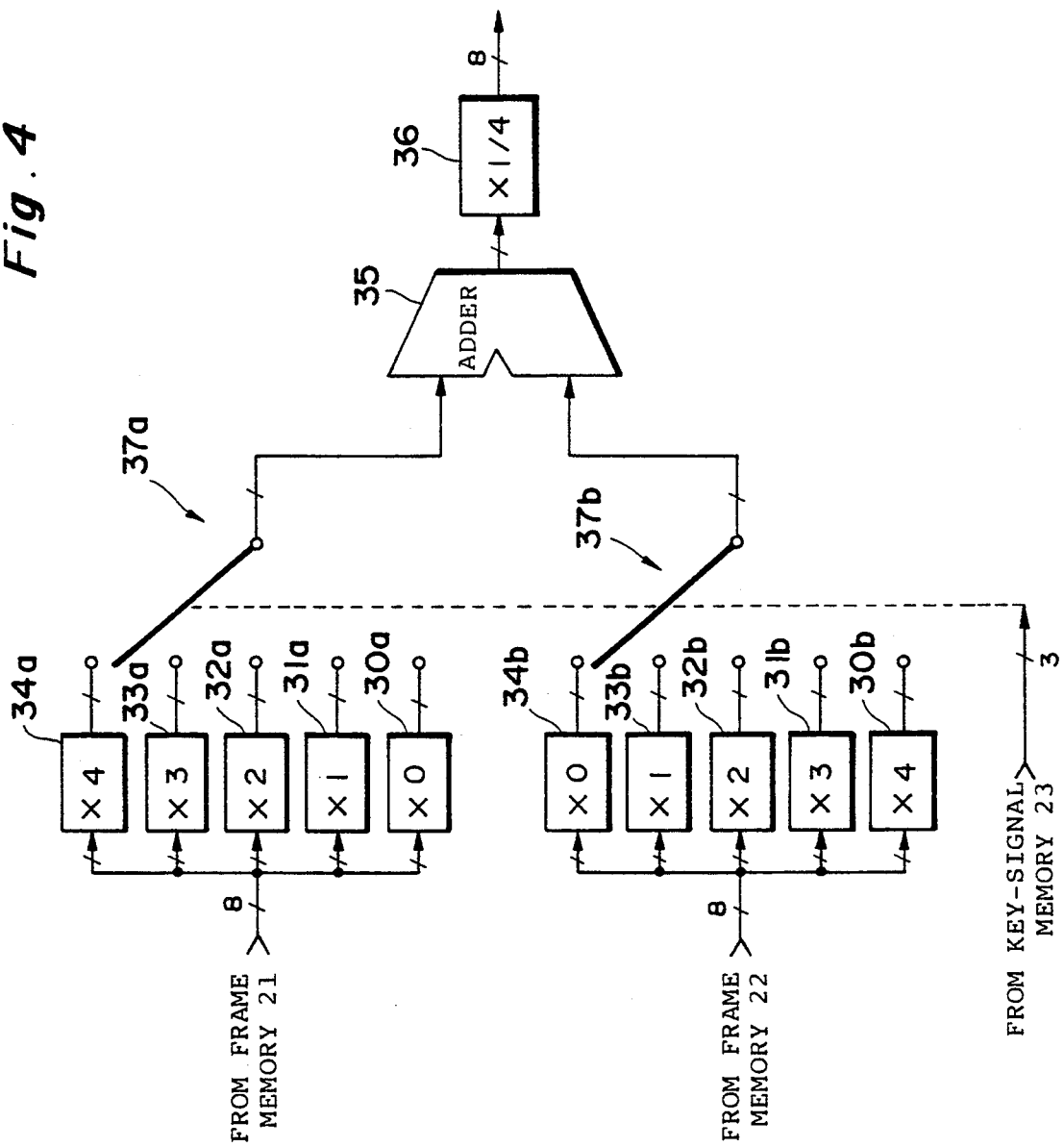

IMAGE PROCESSING APPARATUS AND METHOD, AND VIDEO CAMERA

BACKGROUND OF THE INVENTION

1. Field of the Invention

This invention relates to an image processing apparatus and method and, more particularly, to an image processing apparatus and method for a video camera (which includes a movie-video camera, a still-video camera, a movie/still-video camera, etc.), as well as to the video camera itself.

2. Description of the Related Art

A video camera internally incorporates a solid-state electronic image sensing device such as a CCD for generating a video signal that represents the captured image of a subject. The solid-state electronic image sensing device has a comparatively narrow dynamic range. This means that when the difference between bright and dark portions contained in the field of view is large, it may be difficult to photograph both portions at an appropriate exposure. For example, this is the case when the background is bright and a centrally located main subject is dark, as in photography under backlighted conditions, and when photography is performed in a room having a window, with the main subject being inside the room and outside scenery being visible through the window. When exposure is adjusted so as to expose the main subject (often a person) properly in the photography of such scenes, there are cases in which the bright background portion becomes considerably whitish and the picture no longer appears well-defined. Conversely, if exposure is adjusted so as to expose the bright background properly, the comparatively dark portion (the main subject) becomes blackish and difficult to see.

SUMMARY OF THE INVENTION

An object of the present invention is to provide a video camera in which even if a subject exhibiting a large difference in luminance between bright and dark portions is contained in the field of view, a picture in which both portions are easy to see (namely a picture having appropriate brightness and distinct shading) is obtained.

Another object of the present invention is to provide an image processing apparatus and method particularly effective in the above-described video camera, wherein even if an image represented by a given image signal has comparatively bright and dark portions and the difference in brightness between these portions is considerably large, an image signal capable of reproducing an image in which both portions are easy to see is obtained.

The image signal referred to in the present invention is taken to mean one which covers both an analog video signal and digital image data.

The present invention is premised upon the fact that the image signal contains both a signal component representing a comparatively bright portion of an image and a signal component representing a comparatively dark portion of the image. More specifically, the present invention is premised on the fact that the signal component representing the comparatively bright portion of the image possesses a high level but is not completely saturated and certainly represents an image, the level of the signal component representing the dark portion of the image is fairly low but certainly represents an image, and a substantially tolerable image can be reproduced if solely these signal components are selectively amplified.

In other words, if the foregoing is stated from the viewpoint of the solid-state electronic image sensing device provided in a video camera, the invention is premised on the fact that both the relatively bright and relatively dark portions of the subject contained in the field of view of the camera reside within the dynamic range of the solid-state electronic image sensing device or that exposure control is capable of being so performed that both of these portions will fall within the dynamic range.

From one point of view, an image processing apparatus according to the present invention comprises amplifying means for producing identical first and second image signals from an input image signal and amplifying at least the second image signal in conformity with a difference in brightness between a relatively bright area and a relatively dark area of an image represented by the image signal, discriminating means for discriminating a boundary between the relatively bright area and the relatively dark area of the image, and synthesizing means for producing a composite image signal using the first image signal obtained from the amplifying means with regard to the relatively bright area and the second image signal obtained from the amplifying means with regard to the relatively dark area, the relatively bright and dark areas being demarcated by the boundary discriminated by the discriminating means.

An image processing method according to the present invention comprises the steps of producing identical first and second image signals from one input image signal, amplifying at least one of the first and second image signals in conformity with a difference in brightness between a relatively bright area and a relatively dark area of an image represented by the one input image signal, finding a boundary between the relatively bright area and the relatively dark area of the image, and producing a composite image signal using the first image signal with regard to the relatively bright area and the second image signal with regard to the relatively dark area, the relatively bright and dark areas being demarcated by the boundary found.

The amplifying means takes on at least two forms. In one form, the amplifying means outputs the first image signal as is and outputs the second image signal upon amplifying this signal. In the other form, the amplifying means comprises first and second amplifier means having different amplification factors. The first amplifier means amplifies the applied image signal at a first amplification factor to output the first image signal, and the second amplifier means amplifies the applied image signal at a second amplification factor larger than the first amplification factor to output the second image signal. As will become apparent in the embodiments, it goes without saying that part of the second amplifier means may contain the first amplifier means and can be implemented as a multiple-stage amplifier circuit.

The ratio of the amplification factor (a case in which the amplification factor is 1 also is possible) for the first image signal to the amplification factor for the second image signal may be fixed or variable. In a case where the ratio of the amplification factors is fixed, the ratio is determined statistically or on the basis of experience such that the relative dark area in the image represented by the input image signal has a brightness substantially the same as or slightly less (or conversely, slightly greater) than that of the comparatively bright area, in the image represented by the composite image signal. Further, in the case where the ratio of the amplification factors is variable, at least one of the first and second amplifier means possesses a variable amplification factor. A histogram relating to brightness in the input image signal is created, a brightness distribution representing the comparatively bright area and a distribution representing the comparatively dark area are extracted on the histogram, and the ratio of amplification factors is decided in such a manner that the average brightnesses of the two distributions will become substantially identical (or such that either one will be somewhat greater than the other) in the composite image signal.

In accordance with the invention, the input image signal is amplified at two different amplification factors (where there are cases in which one amplification factor may be 1), only the image signals relating to the image areas represented at the appropriate brightness are extracted from these two amplified image signals, and the extracted signals are combined to obtain the composite image signal. The image reproduced based upon this composite image signal is expressed at a brightness suited to both the comparatively bright and comparatively dark areas. Moreover, the reproduced image exhibits distinct shading and is very easy to see.

The means for producing the composite image signal also comes in many variations.

First, an explanation is given to a variation in which the image is synthesized by digital processing. In this case, first and second A/D converters are provided for converting the first and second image signals outputted by the amplifying means into the corresponding digital image data.

The first and second image signals are obtained by amplifying the input image signal at amplification factors that differ from each other, the image signal relating to the comparatively bright area in the first image signal is the object of the A/D conversion in the first A/D converter, and the image signal representing the comparatively dark area in the second image signal amplified at the larger amplification factor is the object of the A/D conversion in the second A/D converter. Accordingly, it will suffice for these A/D converters to correctly convert, into digital image data, only the levels of the signals that are the object of A/D conversion processing in all levels of the input image signal. This means that A/D converters having a dynamic range narrower than that of the input image signal will suffice. This is advantageous since use can be made of inexpensive A/D converters having a small number of bits (e.g., eight bits).

In this embodiment of the invention, the synthesizing means comprises first memory means for storing the first image signal, second memory means for storing the second image signal, third memory means for storing an area designating signal that designates either of the areas defined by the boundary discriminated by the discriminating means, and changeover means for selectively outputting, in accordance with the area designating signal read out of the third memory means, one of the first and second image signals read synchronously out of the first and second memory means.

In one embodiment, the discriminating means includes comparison means for comparing the first image signal or the second image signal with a prescribed threshold level.

In another embodiment, the discriminating means includes low pass filtering means for low-pass filtering the first image signal or the second image signal, and comparison means for comparing the low-pass-filtered image signal with a prescribed threshold level. As a result, small luminous points in the image are excluded from the image synthesizing operation.

In a further embodiment, the discriminating means is realized as extracting means for extracting an area in which luminance in the image represented by the first image signal is comparatively high and which has an area or length greater than a prescribed value, or an area in which luminance in the image represented by the second image signal is comparatively low and which has an area or length greater than a prescribed value. Small luminous points are excluded from image synthesis with this arrangement as well.

In a preferred embodiment, the synthesizing means includes weighting means for producing a weighted image signal representing a weighted mean of the first and second image signals in the vicinity of the boundary. As a result of this expedient, the boundary line of the combined images is smoothened so that a natural look can be realized in the composite image.

In another embodiment, the synthesizing means includes low-pass filtering means for low-pass filtering the first and second image signals in the vicinity of the boundary. This arrangement also makes it possible to eliminate unnaturalness of the boundary line between the combined images in the composite image.

An embodiment for producing the composite image signal in analog fashion will now be described.

In this embodiment of the invention, the synthesizing means includes a comparator for comparing the first image signal with a prescribed threshold level and generating an output when the level of the first image signal exceeds the prescribed threshold level, and a multiplexer, to which the first and second image signals are entered, for selecting and outputting the second image signal under ordinary circumstances and selecting and outputting the first image signal when an output of the comparator is applied thereto.

The image processing apparatus preferably is provided with a low-pass filter for eliminating high-frequency components of the first image signal, wherein an output from the low-pass filter is applied to the comparator.

Further, the image processing apparatus preferably is provided with a duration detecting circuit for applying the output signal of the comparator to the multiplexer if the duration of this output signal is greater than a reference duration, and a delay circuit for applying the first and second image signals to the multiplexer upon delaying these signals for a period of time corresponding to the reference duration.

A still-video camera according to the present invention internally incorporating the image processing apparatus described above comprises image pick-up means, which includes a solid-state electronic image sensing device, for outputting a video signal, which represents an image obtained by imaging a subject, from the solid-state electronic image sensing device, first amplifier means for amplifying the video signal, which is outputted by the image pick-up means, at a first amplification factor suited to a comparatively bright area of the image, and outputting a first video signal obtained by the first amplification factor, second amplifier means for amplifying the video signal, which is outputted by the image pick-up means, at a second amplification factor greater than the first amplification factor and suited to a comparatively dark area of the image, and outputting a second video signal obtained by the second amplification factor, first A/D converting means for converting the first video signal into first digital image data corresponding to the first video signal, second A/D converting means for converting the second video signal into second digital image data corresponding to the second vide signal, discriminating means for discriminating a boundary between the relatively bright area and the relatively dark area of the image based upon the first digital image data or the second digital image data, and synthesizing means for producing composite image data using the first digital image data obtained from the first A/D converting means with regard to the relatively bright area and the second digital image data obtained from the second A/D converting means with regard to the relatively dark area, the relatively bright and dark areas being demarcated by the boundary discriminated by the discriminating means.

In accordance with the still-video camera according to the present invention, even if a subject in the field of view contains a bright area and a dark area, composite image data corrected to have a brightness appropriate for both areas and to exhibit distinct shading will be obtained as long as the brightnesses of the two areas fall within the dynamic range of the solid-state electronic imaging device.

In general, the dynamic range of a solid-state electronic image sensing device is wider than the processing range of an A/D converter having a small number of bits (e.g., eight bits). Since A/D converters having a range narrower than the range of the input image signal can be used in accordance with the present invention, as mentioned above, the comparatively wide dynamic range possessed by the solid-state electronic image sensing device can be exploited effectively even if use is made of inexpensive A/D converters having a small number of bits.

Exposure control of the still-video camera should be performed in such a manner that both the bright and dark areas of the subject within the field of view fall within the dynamic range of the solid-state electronic image sensing device. In general, exposure control should be performed to a degree suitable for photography of the comparatively bright area of the subject or to such an extent that the amount of exposure would be less than that for this photography.

A video camera according to the present invention capable of real-time processing of a video signal and suitable for attaining a movie-video camera comprises image pick-up means, which includes a solid-state electronic image sensing device, for outputting a video signal, which represents an image obtained by imaging a subject, from the solid-state electronic image sensing device, first amplifier means for amplifying the video signal, which is outputted by the image pick-up means, at a first amplification factor suited to a comparatively bright area of the image, and outputting a first video signal obtained by the first amplification factor, second amplifier means for amplifying the video signal, which is outputted by the image pick-up means, at a second amplification factor greater than the first amplification factor and suited to a comparatively dark area of the image, and outputting a second video signal obtained by the second amplification factor, a comparator for comparing the first video signal with a prescribed threshold level and generating an output when the level of the first video signal exceeds the prescribed threshold level, and a multiplexer, to which the first and second video signals are entered, for selecting and outputting the second video signal under ordinary circumstances and selecting and outputting the first video signal when an output of the comparator is applied thereto.

In a preferred embodiment, an automatic gain-controlled amplifier circuit is provided for adjusting the level of the second video signal.

With this video camera also, a video signal corrected to have a brightness appropriate for both comparatively bright and comparatively dark areas contained by a subject and to exhibit distinct shading is obtained.

As defined from a second point of view, an image processing apparatus according to the invention comprises amplifying means for producing identical first and second image signals from one input image signal and amplifying at least one of the first and second image signals in conformity with a difference in brightness between a relatively bright area and a relatively dark area of an image represented by the one input image signal, and synthesizing means for combining the first image signal and the second image signal, which are obtained from the amplifying means, by adding the first and second image signals at a prescribed ratio.

An image processing method according to the invention comprises the steps of producing identical first and second image signals from one input image signal, amplifying at least one of the first and second image signals in conformity with a difference in brightness between a relatively bright area and a relatively dark area of an one input image represented by the image signal, and combining the first image signal and the second image signal by adding the first and second image signals at a prescribed ratio.

Embodiments of the amplifying means are the same as those described above.

In a case where synthesizing processing is performed digitally, two A/D converters are provided for converting the first and second image signals outputted by the amplifying means into corresponding digital image data, with the items of digital image data obtained from the two A/D converters being applied to the synthesizing means. Inexpensive A/D converters can be used as in the reasons set forth above.

According to this aspect of the invention as well, since two image signals amplified at two different amplification factors are combined, it is possible to obtain a video signal corrected to have a brightness appropriate for both the comparatively bright and dark areas of a subject represented by one input image signal and to exhibit distinct shading.

The prescribed ratio in the synthesizing means may be fixed or variable. In a case where the ratio is made variable, the prescribed ratio is varied in dependence upon the level of the first image signal in such a manner that the proportion of the first image signal is enlarged for the comparatively bright area and the proportion of the second image signal is enlarged for the comparatively dark area. As a result, the comparatively bright and dark areas in the image are rendered smoothly continuous so that a composite image signal representing a highly natural image is obtained.

Furthermore, the present invention provides a digital still-video camera internally incorporating the image processing apparatus described above. The digital still-video camera comprises image pick-up means, which includes a solid-state electronic image sensing device, for outputting a video signal, which represents an image obtained by imaging a subject, from the solid-state electronic image sensing device, first amplifier means for amplifying the video signal, which is outputted by the image pick-up means, at a first amplification factor suited to a comparatively bright area of the image, and outputting a first video signal obtained by the first amplification factor, second amplifier means for amplifying the video signal, which is outputted by the image pick-up means, at a second amplification factor greater than the first amplification factor and suited to a comparatively dark area of the image, and outputting a second video signal obtained by the second amplification factor, first A/D converting means for converting the first video signal into first digital image data corresponding to the first video signal, second A/D converting means for converting the second video signal into second digital image data corresponding to the second video signal, and synthesizing means for combining the first digital image data and the second digital image data by adding these items of data at a prescribed ratio.

With this digital still-video camera also, it is possible to obtain composite image data representing an image corrected to have a brightness appropriate for both the comparatively bright and dark areas of a subject in the field of view and to exhibit distinct shading. Further, the dynamic range of the solid-state electronic image sensing device can be exploited effectively using two inexpensive A/D converters having a small bit width.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram illustrating an example of a circuit for taking the weighted mean of image data at a boundary between a bright area and a dark area;

DESCRIPTION OF THE PREFERRED EMBODIMENTS

Figure 1:
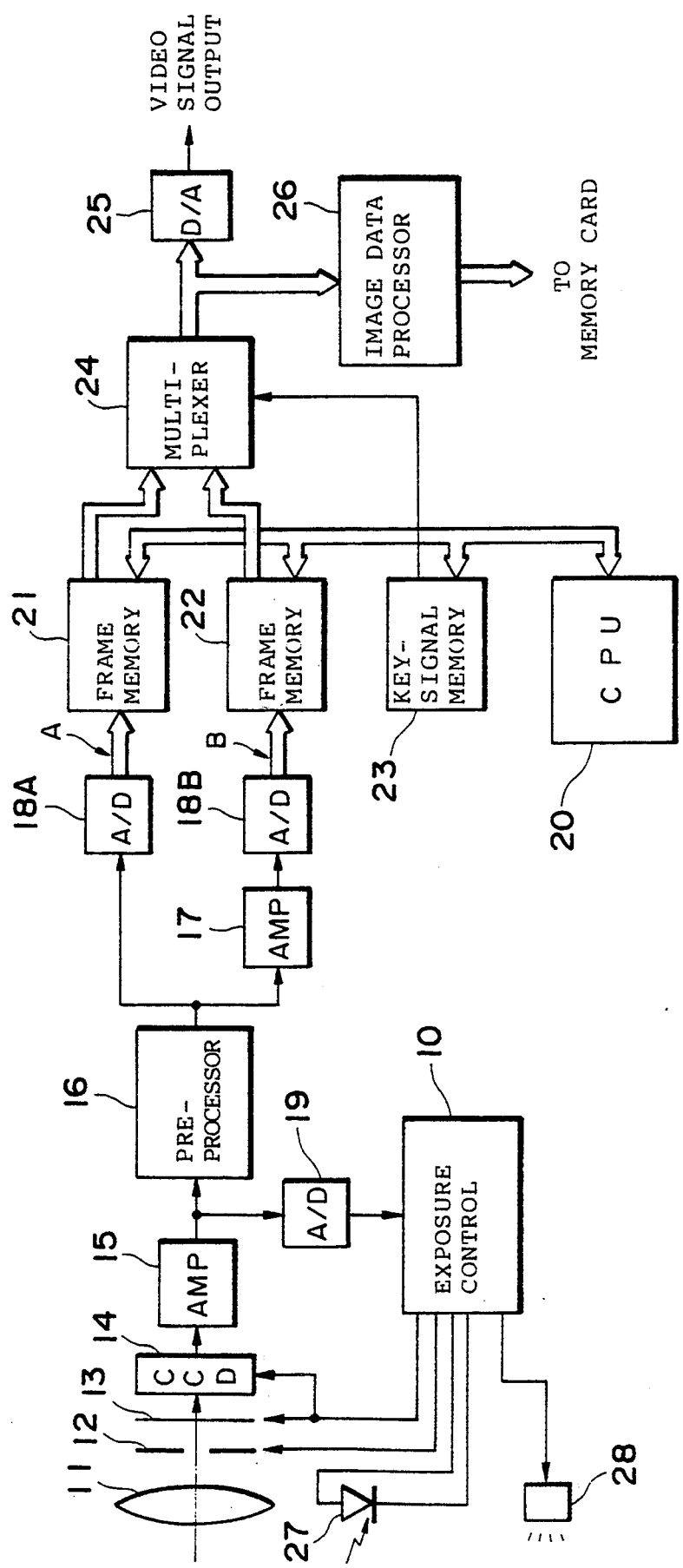
FIG. 1 is a block diagram illustrating an embodiment in which the present invention is applied to a still-video camera.

FIG. 1 illustrates the configuration of a still-video camera (an electronic still-video camera) according to an embodiment of the present invention.

An image pick-up optical system includes an image pick-up lens 11, a diaphragm 12, a shutter 13 and a CCD 14 serving as a solid-state electronic image sensing device (image sensor). An exposure control circuit 10 includes a CPU. The exposure control circuit 10 decides the amount of exposure based upon a photometric signal obtained from a photometric sensor 27 and controls the diaphragm 12 and the shutter 13 as well as clearing of electric charge and signal readout in the CCD 14.

The amount of exposure is decided in such a manner that comparatively bright and comparatively dark areas in a subject within the field of view of the image pick-up optical system will both fall within the dynamic range of the CCD 14. Generally it will suffice if the amount of exposure is determined based upon the average luminance of the subject or a luminance value slightly less than the average luminance. Exposure control can be carried out by adjusting at least the f-stop of the diaphragm 12 or the shutter speed of the shutter 13. An electronic shutter function in the CCD 14 may be utilized instead of providing the shutter 13. If necessary, preliminary imaging is performed and the proper amount of exposure can be decided based upon the results of preliminary imaging. Further, if necessary, a strobe unit can be driven to fire a strobe.

The video signal, which represents the image of the subject, outputted by the CCD 14 as a result of photography is amplified by an amplifier 15, after which the amplified signal is subjected to such pre-processing as a gamma correction, etc. in a pre-processing circuit 16. The output video signal of the pre-processing circuit 16 is converted into digital image data A by an A/D converter 18A, after which the data A is stored temporarily in a first frame memory 21. The output video signal of the pre-processing circuit 16 is amplified by an amplifier 17, after which the amplified signal is converted into digital image data B by an A/D converter 18B. The data B is then stored temporarily in a second frame memory 22.

The digital data A is produced by being amplified in the amplifier 15 in such a manner that a comparatively bright area in the image of the object will have an appropriate brightness when reproduced. The digital data B is produced by being amplified in the amplifiers 15 and 17 in such a manner that a comparatively dark area in the image of the object will have an appropriate brightness when reproduced. It does not matter if the data representing the comparatively bright area in the image data B saturates. The amplification gain of the amplifier 17 may be fixed or variable. An arrangement may be adopted in which preliminary imaging is performed, a histogram indicating the distribution of brightness is created with regard to the image data obtained by the preliminary imaging, and the amplification factor of the amplifier 17 is determined in such a manner that the comparatively bright distribution and comparatively dark distribution in the histograms will substantially overlap or the comparatively dark distribution will come fairly close to the comparatively bright distribution.

Image data representing one image is created in the manner described below by inlay synthesizing processing using the two items of image data (each composed of one frame or one field of data) of different brightness stored in the first and second frame memories 21 and 22. In order to perform inlay synthesizing processing, a key-signal memory 23 for storing a key signal, a CPU 20 and a multiplexer 24 are provided in addition to the first and second frame memories 21, 22.

The CPU 20 compares the pixel-by-pixel image data stored in the first frame memory 21 with a prescribed threshold value TH (it will suffice if this value is one that enables a comparatively bright area to be distinguished from other areas), decides that image data having a value greater than this threshold value belongs to a comparatively bright area and, upon making this decision, writes data "1" (one bit) as a key signal in a storage location of the key-signal memory 23 that corresponds to the pixel represented by this image data. As for image data of a pixel whose value is less than the threshold value, the CPU 20 writes "0" in the storage location of the key-signal memory 23 corresponding to this pixel. The key-signal memory 23 has a capacity capable of storing one frame (or one field) of the key signals (the key signal is composed of one bit per pixel).

Thus, key-signal data indicating whether the image data stored in the first and second frame memories 21, 22 relates to a pixel belonging to a comparatively dark area of the image of the subject (the key-signal data is "0" in this case) or a pixel belonging to a comparatively bright area (the key-signal data is "1" in this case) is written.

The multiplexer 24 is controlled by the key-signal data that has been set in the key-signal memory 23. The multiplexer 24 selects and outputs the image data, which has been read out of the first frame memory 21, when the key-signal data is "1" and selects and outputs the image data, which has been read out of the second frame memory 22, when the key-signal data is "0".

When the setting of the key-signal data in the key-signal memory 23 ends, the image data in the first and second frame memories 21 and 22 and the key-signal data in the key-signal memory 23 are read out synchronously (i.e., items of data relating to the same pixel are read out simultaneously) and applied to the multiplexer 24. In dependence upon the key-signal data, the multiplexer 24 selectively outputs the image data read out of the first and second frame memory 21 or 22, as mentioned above. The data outputted by the multiplexer 24 represents an inlaid image synthesized by using the image data of the first frame memory 21 with regard to the comparatively bright area and the image data of the second frame memory 22 with regard to the comparatively dark area.

The image data outputted by the multiplexer 24 is converted into an analog video signal by a D/A converter 25, and the analog video signal is delivered as an output signal. If the analog video signal is applied to a display unit such as a CRT, the inlaid image will be displayed. The video signal can be frequency modulated and then recorded on a magnetic recording medium such as a floppy disk or magnetic tape. Alternatively, the output image data from the multiplexer 24 is separated into luminance data and color data (i.e., subjected to a Y/C separation) and subjected to data compression and coding by an image-data processing circuit 26 before being recorded on a memory card (also referred to as a "memory cartridge", which has an internal semiconductor memory). Of course, the above-described inlay synthesizing processing of the image data need not be performed in the still-video camera. In such case, the image data in the first and second frame memories 21 and 22 would be subjected to image processing separately and stored in separate areas of the memory card. The inlay synthesizing of the image data would be performed by a separately provided image processing apparatus.

The key signal is produced using the image data that has been stored in the second frame memory 22. In this case, it will suffice to use a suitable threshold value to discriminate the data representing the comparatively dark area of the image of the subject. Since the image data of the comparatively bright area of the image of the subject often is saturated in the image data of the second frame memory 22, the threshold value should be set to be slightly smaller than the saturation level.

Methods of distinguishing between a comparatively bright area and a comparatively dark area in the image of the subject include various methods other than the above-described processing method of simply comparing the image data with the threshold value. These other methods will be described below but will deal solely with the extraction of a comparatively bright area since extraction of a comparatively dark area can be performed in exactly the same manner.

Figure 2A:
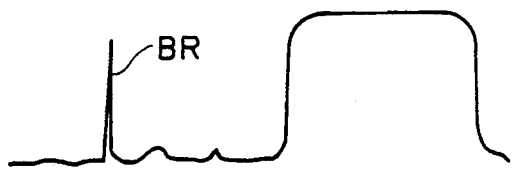
FIG. 2a is a waveform diagram illustrating an example of a video signal.

FIG. 2a illustrates an example of a video signal along a certain horizontal scanning line of the image of the subject. It will be assumed that a small luminous point (caused when a fragment of glass or a piece of metal appears to shine owing to light reflected from it) exists in the comparatively dark area, and that a sharp pulse-shaped waveform BR appears in the video signal owing to this luminous point.

When this video signal is passed through a low-pass filter (hereinafter referred to as an "LPF"), the sharp pulse-shaped waveform is smoothened and the height thereof diminishes, as indicated at br in FIG. 2b. If this video signal is subjected to level discrimination using a threshold value TH set at a level higher than the peak value of the waveform br, only the bright area is extracted. Thus, small luminous points present in parts of the dark area are neglected and execution of inlay synthesizing with regard to such small areas is prevented before it occurs.

Techniques for filtering digital data are well known. The discussion presented above applies also to processing in the CPU 20 for discriminating the bright and dark areas from each other by processing the digital image data stored in the first frame memory 21 (or the second frame memory 22) in the still-video camera shown in FIG. 1. The CPU 20 subjects the digital image data to low-pass filtering and compares the filtered image data with the data representing the threshold value.

Figure 3A:
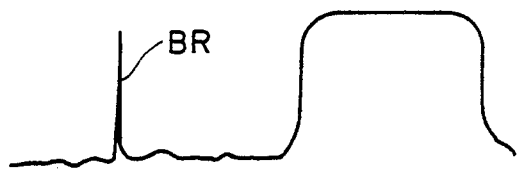
FIGS. 3a, 3b, and 3c are waveform diagrams illustrating processing for detecting a bright area in excess of a predetermined width.
Figure 3B:
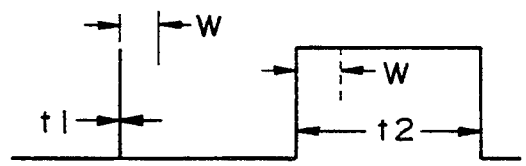
Figure 3C:
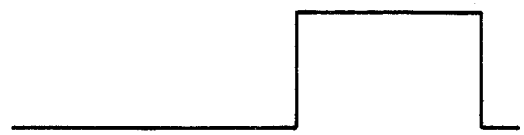

FIGS. 3a, 3b and 3c illustrate another method of discrimination. FIG. 3a illustrates a video signal identical with that shown in FIG. 2a. In this video signal, leading edges indicating steep positive-going transitions and trailing edges indicating steep negative-going transitions are detected, and widths (or times) t1, t2, etc., from leading edges to trailing edges are measured. Such widths t1, t2 are compared with a suitable reference width W (see FIG. 3b). Only a portion having a width greater than the reference width W is judged to be a comparatively bright area (see FIG. 3c). In accordance with this method also small luminous points present in the comparatively dark area can be excluded from the area that is to be subjected to inlay synthesis.

It goes without saying that this method also can be executed in both analog and digital fashion. If the method is executed in analog fashion, a monostable multivibrator having a stabilization time corresponding to the reference width W can be used. The monostable multivibrator is triggered (set) by the leading edge of the video signal and is reset by the trailing edge of the video signal. If the monostable multivibrator generates an output after being set but before being reset (i.e., if a period of time corresponding to the width W elapses after the multivibrator has been set), this portion is judged to be the bright area. In digital execution, it will suffice to determine whether the length from the leading edge to the trailing edge is greater than the width W.

Figure 2B:
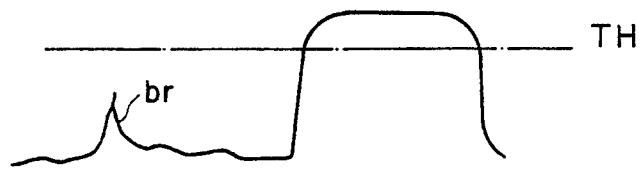
FIG. 2b is a waveform diagram illustrating the video signal after being passed through a low-pass filter.

Since a phase lag inevitably occurs in filtering, there is a possibility that a slight shift in the boundary of the bright area will be encountered with the method illustrated in FIGS. 2a, 2b. By contrast, the method shown in FIGS. 3a, 3b and 3c is advantageous in that the boundary between the bright and dark areas can be determined accurately without any shift.

Though detection of a boundary (which extends in the direction of the vertical scanning lines of the image) between areas appearing in a video signal along a horizontal scanning line has been described, a method similar to that set forth above can be employed to also detect a horizontally extending boundary in an image. At any rate, if the digital image data is processed digitally, then filtering and detection of the width in the vertical direction proceed with ease. Further, by executing the method of FIGS. 3a, 3b and 3c two-dimensionally, luminous points having an area less than a predetermined area can be excluded from the object of inlay synthesis and it is possible to perform inlay synthesis solely with regard to a bright area having an area which exceeds the predetermined area.

FIG. 4, which illustrates another example of inlay synthesizing processing, shows a circuit particularly for implementing a technique for smoothly connecting the neighborhood of the boundary between two areas to be fit together. The circuit shown in FIG. 4 is substituted for the multiplexer 24 in FIG. 1.

The image data (eight bits, for example) read out of the first frame memory 21 is multiplied by 0, 1, 2, 3 and 4 by multipliers 30a, 31a, 32a, 33a and 34a, respectively, before being applied to a multiplexer (changeover switch) 37a. The image data read out of the second frame memory 22 is multiplied by 4, 3, 2, 1 and 0 by multipliers 30b, 31b, 32b, 33b and 34b, respectively, before being applied to a multiplexer 37b. The multiplexers 37a and 37b are controlled by the key-signal data (three-bit data in this embodiment) provided by the key-signal memory 23. The multiplexer 37b selects the multiplier 30b, 31b, 32b, 33b or 34b when the multiplexer 37a selects the multiplier 30a, 31a, 32a, 33a or 34a, respectively.

The outputs of the multiplexers 37a and 37b are added together by the adder 35, the sum is divided by four by a divider 36 and the result is outputted as composite image data (which is again composed of, say, eight bits).

The multiplexers 37a and 37b respectively select the multipliers 32a and 32b for one pixel on the boundary line detected between the comparatively dark and bright areas. As a result, the mean value of the image data in the first frame memory 21 and the image data in the second frame memory 22 becomes the composite image data on the boundary line.

The multiplexers 37a and 37b respectively select the multipliers 33a and 33b for one pixel neighboring the above-mentioned boundary line on the bright-area side thereof. As a result, the mean (weighted mean) of a value three times the image data in the first frame memory 21 and a value one times the image data in the second frame memory 22 becomes the composite image data.

With regard to all pixels located in the bright area further inward from the above-mentioned pixel neighboring the boundary line, the multiplexers 37a and 37b respectively select the multipliers 34a and 34b. As a result, the image data in the first frame memory 21 is outputted as the composite image data.

The multiplexers 37a and 37b respectively select the multipliers 31a and 31b for one pixel neighboring the boundary line on the dark-area side thereof, As a result, the mean (weighted mean) of a value three times the image data in the second frame memory 22 and a value one times the image data in the first frame memory 21 becomes the composite image data.

With regard to all pixels located in the dark area further inward from the above-mentioned pixel neighboring the boundary line, the multiplexers 37a and 37b respectively select the multipliers 30a and 30b. As a result, the image data in the second frame memory 22 is outputted as the composite image data.

The key-signal data stored in the key-signal memory 23 is created as three-bit data by the CPU 20 in dependence upon whether the position of a pixel is on the boundary line, neighboring the boundary line or more distant from the boundary line and which area the pixel belongs so as to control the multiplexers 37a and 37b in the manner described above.

Thus, in the vicinity of the boundary between the comparatively bright and dark areas, the composite image data is created by a weighted mean (weighted in dependence upon position) of two types of image data to be fit together, as described above. This means that the image data is rendered smoothly continuous in the vicinity of the boundary. As a result, the boundary between the two areas appears natural when the composite image is reproduced, and the occurrence of a false contour is prevented.

Though weighting for the purpose of taking a weighted mean is changed pixel by pixel in the description given above, it goes without saying that weighting may be changed several pixels at a time.

The two A/D converters 18A and 18B are used in the circuit illustrated in FIG. 1. Moreover, the video signal fed into the A/D converter 18B is amplified by the amplifier 17. An advantage obtained by virtue of this arrangement is that use can be made of inexpensive A/D converters having a small bit width (e.g., eight bits). The reason for this will now be described.

The dynamic range of a CCD generally is said to be narrow, meaning that the dynamic range is narrow in comparison with a silver halide film. In a case where the video signal from a CCD is converted into digital image data, 10~12 bits are necessary if the A/D conversion is to be performed properly not only with regard to a comparatively bright area but also with regard to a comparatively dark area. When an eight-bit A/D converter is used, a conversion to digital data cannot be made correctly owing to the effects of a noise component, particularly in the comparatively dark area. However, an A/D converter capable of outputting 10 or 12 bits is more costly than an eight-bit A/D converter. In accordance with the arrangement shown in FIG. 1, the video signal representing the comparatively bright area of the image of the subject is converted into digital image data by the A/D converter 18A (data of the comparatively dark area is not used in inlay synthesis), and the video signal representing the comparatively dark area of the image of the subject is amplified by the amplifier 17, after which the amplified signal is converted into digital image data by the A/D converter 18B (data of the comparatively bright area is not used in inlay synthesis). Accordingly, the items of data used in inlay synthesis are both subjected to conversion processing substantially at the center of the range of the A/D converters. In particular, since the video signal representing the comparatively dark area of the image of the subject is amplified by the amplifier 17 and then fed into the A/D converter 18B, the signal is converted into digital image data at a sufficiently high accuracy. Thus, since a broad range of the dynamic range of the CCD 14 is processed by using the two A/D converters 18A and 18B to share the processing burden, a video signal having a comparatively broad dynamic range from the CCD 14 can be converted into digital image data faithfully even when inexpensive eight-bit A/D converters are used as the A/D converters.

Figure 5:
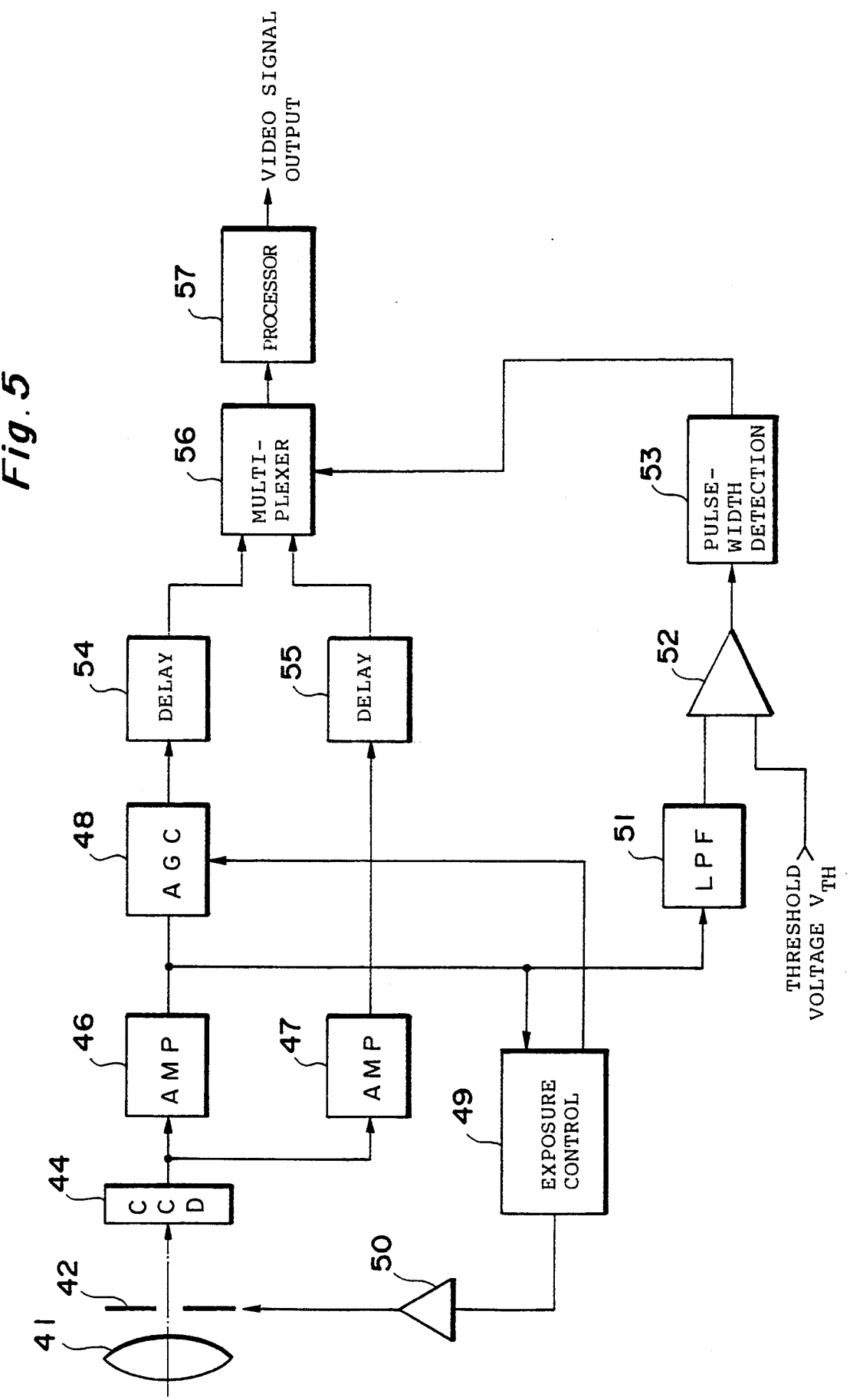
FIG. 5 is a block diagram illustrating an embodiment in which video signals are combined in real time.

FIG. 5 illustrates an embodiment for performing inlay synthesizing processing of an image in terms of an analog video signal in real time. The circuit of this embodiment is applicable not only to a still-video camera but also to a movie-video camera.

The image pick-up optical system includes an image pick-up lens 41, a diaphragm 42 and a CCD 44. A light image representing the subject is formed on the CCD 44 via the lens 41 and diaphragm 42. The video signal outputted by the CCD 44 is amplified by an amplifier 46, after which the amplified signal is applied to an automatic gain-controlled amplifier circuit (hereinafter referred to as an "AGC") 48 and an exposure control circuit 49. The video signal outputted by the CCD 44 is amplified also by an amplifier 47. The exposure control circuit 49 controls the diaphragm 42 via the driver 50 and adjusts the gain of the AGC 48.

On the basis of the level of the video signal provided by the amplifier 46, the exposure control circuit 49 adjusts the diaphragm 42 so as to expose the subject properly. The shutter speed (exposure time) is fixed and held at 1/60 sec (or 1/30 sec), by way of example. In other words, exposure time is stipulated by the clearing of unnecessary charge from the CCD 44 and the readout of signal charge (this is an electronic shutter function); no mechanical shutter is provided.

In this embodiment, continuous photography of a subject is carried out. For example, one field (or one frame) of a video signal is outputted from the CCD 44 every 1/60 sec (or 1/30 sec).

The amplification gain of the amplifier 47 is set to be two to five times that of the amplifier 46. The amplification gain of the amplifier 47 may be fixed or variable. In any case, the amplification gain of the amplifier 47 is adjusted or set in such a manner that the output video signal of the amplifier 47 will have a level that expresses the comparatively dark area of the image of the subject by an appropriate brightness.

Inlay synthesis is performed using the video signal of the comparatively bright area represented by the output video signal of the amplifier 46 and the video signal of the comparatively dark area represented by the output video signal of the amplifier 47. The AGC 48 is provided so that when the image of the comparatively dark area and the image of the comparatively bright area are combined, these images will be matched in an appropriate manner (that is, the AGC 48 is provided in order to prevent a situation in which the image of the comparatively bright area becomes darker than the image of the comparatively dark area in the picture resulting from synthesis). The exposure control circuit 49 detects the peak level of the video signal of the previous field (or previous frame) provided by the amplifier 46 and adjusts the gain of the AGC 48 in such a manner that the peak level will be held constant in the next field (or next frame) of the video signal as well. Thus, the gain adjustment of the AGC 48 is carried out every field (or every frame) (every 1/60 sec or every 1/30 sec) and the brightness of the brightest portion of the image of the comparatively bright area is held substantially constant at all times.

The output of the amplifier 46 is passed through an LPF 51 so that only the low-frequency components thereof are applied to a comparator 52. The comparator 52, which is set at a threshold voltage $V_{TH}$, produces an output when the level of the input video signal exceeds the threshold voltage $V_{TH}$. The output of the comparator 52 enters a pulse-width detecting circuit 53. As mentioned earlier, the pulse-width detecting circuit 53 includes a monostable multivibrator and, when the pulse width of the output signal from the comparator 52 exceeds the reference width W, delivers its output upon applying a time delay corresponding to the reference width W. The output signal of a pulse-width detecting circuit 53 is applied to a multiplexer 56 as its control signal.

Delay circuits 54 and 55 are set to delay times equal to a period of time corresponding to the reference width W (or a length of time obtained by adding a delay time, which is ascribable to the operation of the LPF 51, to the above-mentioned period of time). The output video signal of the AGC 48 and the output video signal of the amplifier 47 enter the multiplexer 56 upon being delayed by the delay time applied by the delay circuits 54 and 55.

The multiplexer 56 ordinarily selects and outputs the output video signal of the delay circuit 55 and, when an output signal from the pulse-width detecting circuit 54 is applied thereto, selects and outputs the output video signal of the delay circuit 54. As a result, inlay synthesis of the images based upon the above-described principle is performed. The output video signal from the multiplexer 56 is subjected to a gamma correction, etc. in a video-signal processing circuit 57.

Figure 6:
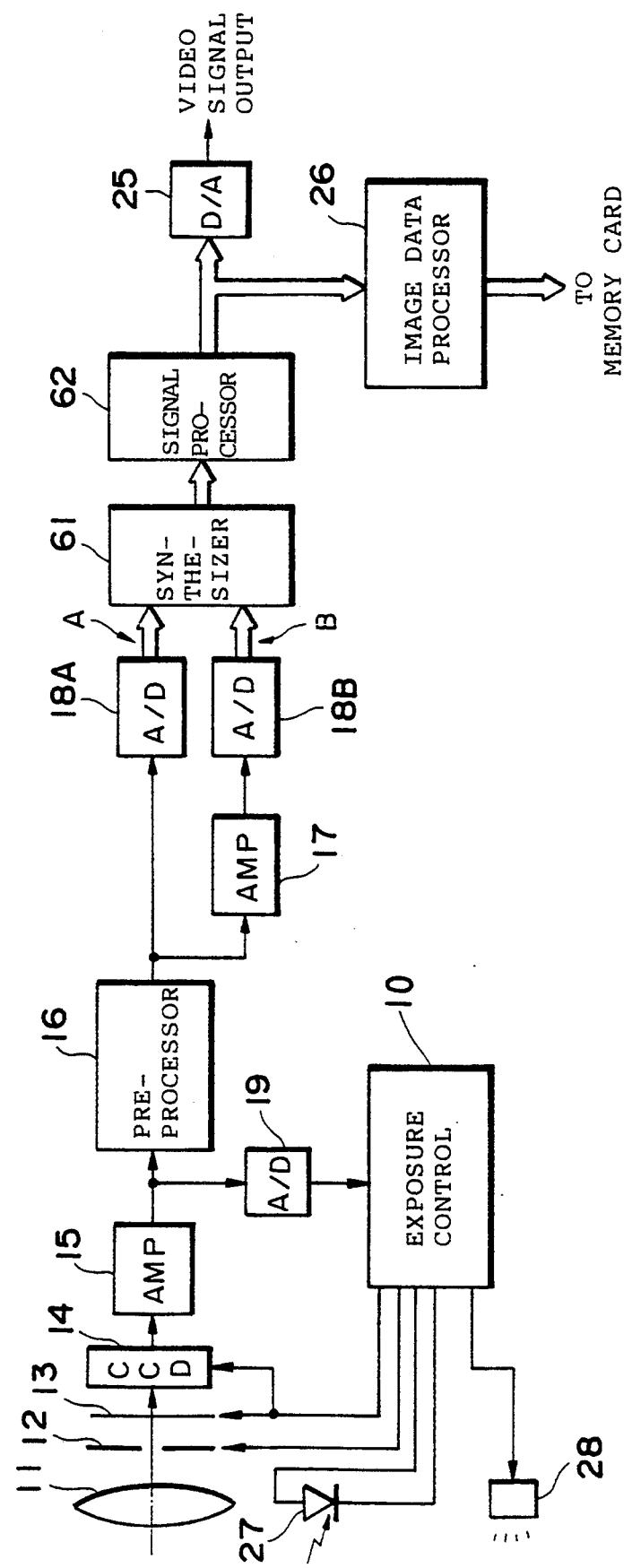
FIG. 6 is a block diagram illustrating another embodiment of the present invention.

FIG. 6 illustrates another embodiment. In the above-described embodiment, inlay synthesizing processing is performed as the method of combining two video signals (or two items of image data). In this embodiment, however, synthesis is carried out by weighted addition. Components in FIG. 6 identical with those shown in FIG. 1 are designated by like reference numerals and need not be described again.

Figure 7:
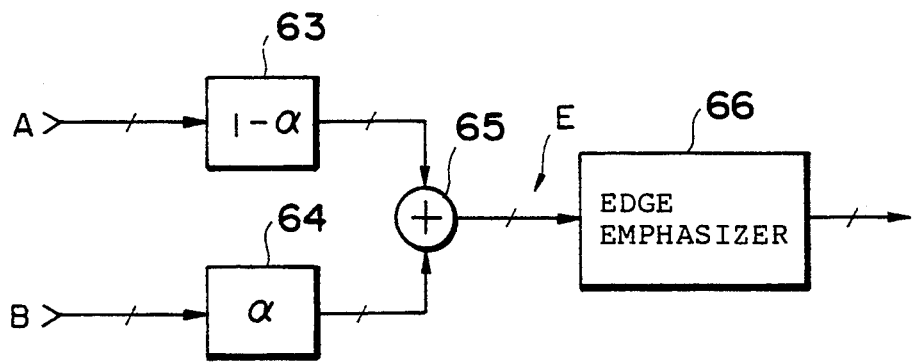
FIG. 7 is a block diagram illustrating an example of the construction of a synthesizing circuit.
Figure 8:
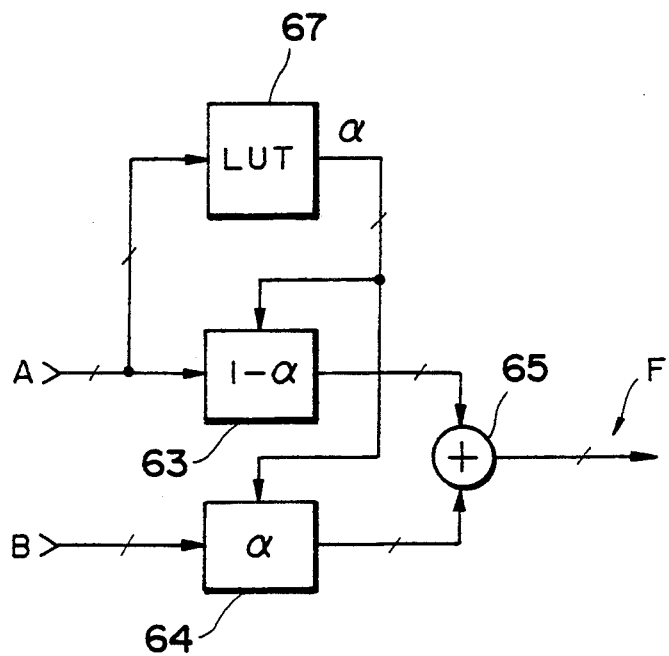
FIG. 8 is a block diagram illustrating another example of the construction of a synthesizing circuit.

Items of digital image data A and B obtained from the A/D converters 18A and 18B are applied to a mixing circuit 61, the construction of which is shown in FIGS. 7 and 8.

In FIG. 7, the image data A is multiplied by $(1-\alpha)$ in a coefficient unit 63 using a suitable coefficient $\alpha$ ($\alpha < 1$).

Figure 9:
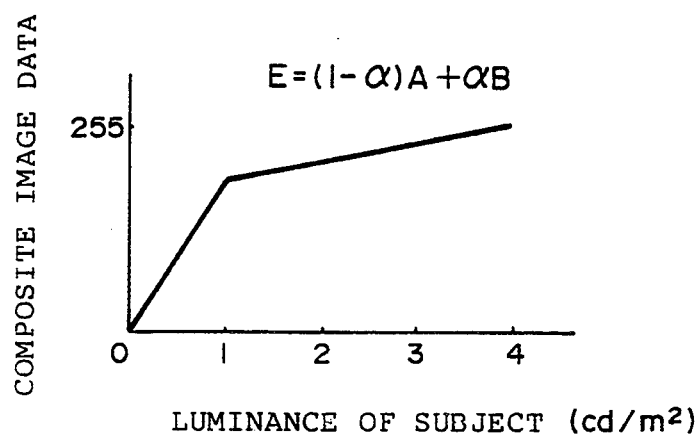
FIG. 9 is a graph showing the level of output image data from the synthesizing circuit of FIG. 7.

The image data B is multiplied by α in a coefficient unit 64. The items of output image data from the coefficient units 63 and 64 are added by an adder 65 to obtain image data E. The composite image data E is subjected to vertical-contour emphasizing processing in an edge emphasizing circuit 66. The level of the composite image data E is illustrated in FIG. 9 in correlation with luminance.

Figure 10:
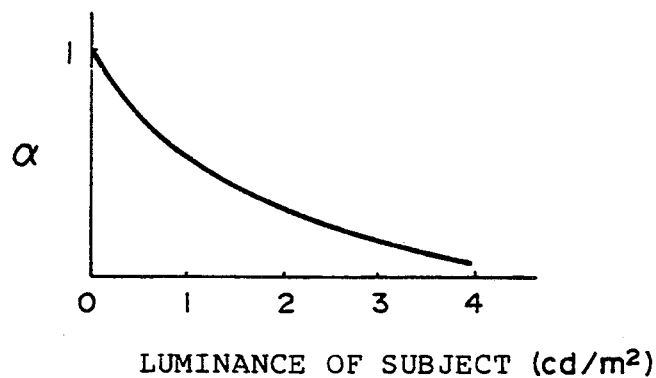
FIG. 10 is a graph showing a coefficient used in the synthesizing circuit of FIG. 8.
Figure 11:
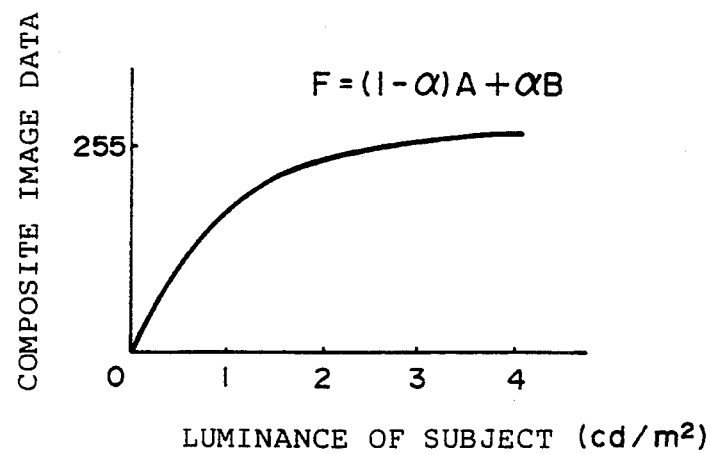
FIG. 11 is a graph showing the level of output image data from the synthesizing circuit of FIG. 8.

In FIG. 8, the above-mentioned coefficient α varies in dependence upon the level (subject luminance) of the image data A, as illustrated in FIG. 10. More specifically, the coefficient α becomes larger for lower the levels of the image data A (at portions where the luminance is low) and becomes smaller for higher levels of the image data A (at portions where the luminance is high). These values of the coefficient α are stored in a look-up table (LUT) 67 in advance. An address of the LUT 67 is designated by the image data A, and data representing the coefficient α corresponding to this address is read out of the LUT 67. The coefficient α read out of the LUT 67 is applied to each of the coefficient units 63, 64. Accordingly, composite image data F is rendered smoothly continuous, as illustrated in FIG. 11. It should be noted that the edge emphasizing circuit is not illustrated in FIG. 8.

If necessary, the output image data E or F of the mixing circuit 61 is subjected to knee processing or the like in a signal processing circuit 62. The edge emphasizing circuit 66 may be incorporated in the signal processing circuit 62.

It goes without saying that the synthesizing processing based upon weighted addition shown in FIG. 6 can be realized in analog fashion.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   image sensing means for outputting one input image signal;
   amplifying means for amplifying said one input image signal so as to provide identical first and second image signals and amplifying at least one of the first and second image signals in conformity with a difference in brightness between a relatively bright area and a relatively dark area of an image represented by the one input image signal;
   discriminating means for discriminating a boundary between the relatively bright area and the relatively dark area of the image; and
   synthesizing means for producing a composite image signal using the first image signal obtained from said amplifying means with regard to the relatively bright area and the second image signal obtained from said amplifying means with regard to the relatively dark area, said relatively bright and dark areas being demarcated by the boundary discriminated by said discriminating means.

2. The apparatus according to claim 1, wherein said amplifying means outputs the first image signal as is and outputs the second image signal upon amplifying said second image signal.

3. The apparatus according to claim 1, wherein said amplifying means comprises first and second amplifier means having different amplification factors;
said first amplifier means amplifying the one input image signal at a first amplification factor to output the first image signal; and
said second amplifier means amplifying the one input image signal at a second amplification factor larger than the first amplification factor to output the second image signal.

4. The apparatus according to claim 1, further comprising two A/D converters for converting the first and second image signals outputted by said amplifying means into corresponding digital image data.

5. The apparatus according to claim 1, wherein said synthesizing means includes:
   first memory means for storing the first image signal;
   second memory means for storing the second image signal;
   third memory means for storing an area designating signal that designates either of the relatively bright and dark areas defined by the boundary discriminated by said discriminating means; and
   changeover means for selectively outputting, in accordance with the area designating signal read out of said third memory means, one of the first and second image signals read synchronously out of said first and second memory means.

6. The apparatus according to claim 1, wherein said discriminating means includes comparison means for comparing the first image signal or the second image signal with a prescribed threshold level.

7. The apparatus according to claim 1, wherein said discriminating means includes:
   low-pass filtering means for low-pass filtering the first image signal or the second image signal; and
   comparison means for comparing the low-pass-filtered image signal with a prescribed threshold level.

8. The apparatus according to claim 1, wherein said discriminating means extracts an area in which luminance in the image represented by the first image signal is comparatively high and which has an area or length greater than a prescribed value, or an area in which luminance in the image represented by the second image signal is comparatively low and which has an area or length greater than a prescribed value.

9. The apparatus according to claim 1, wherein said synthesizing means weighting includes means for producing a weighted image signal representing a weighted mean of the first and second image signals in the vicinity of the boundary.

10. The apparatus according to claim 1, wherein said synthesizing means includes low-pass filtering means for low-pass filtering the first and second image signals in the vicinity of the boundary.

11. The apparatus according to claim 1, wherein said synthesizing means includes:
    a comparator for comparing the first image signal with a prescribed threshold level and generating an output when the level of the first image signal exceeds said prescribed threshold level; and
    a multiplexer, to which the first and second image signals are entered, for normally selecting and outputting the second image signal and selecting and outputting the first image signal when an output of said comparator is applied thereto.

12. The apparatus according to claim 11, further comprising a low-pass filter for eliminating high-frequency components of the first image signal, wherein an output from said low-pass filter is applied to said comparator.

13. The apparatus according to claim 11, further comprising:
   a duration detecting circuit for applying the output signal of said comparator to said multiplexer if the duration of the output signal of said comparator is greater than a reference duration; and
   a delay circuit for applying the first and second image signals to said multiplexer upon delaying the first and second image signals for a period of time corresponding to the reference duration.

14. A still-video camera comprising:
   image pick-up means, which includes a solid-state electronic image sensing device, for outputting a video signal, which represents an image obtained by imaging a subject, from said solid-state electronic image sensing device;
   first amplifier means for amplifying the video signal, which is outputted by said image pick-up means, at a first amplification factor suited to a comparatively bright area of the image, and outputting a first video signal obtained by said first amplification factor;
   second amplifier means for amplifying the video signal, which is outputted by said image pick-up means, at a second amplification factor greater than the first amplification factor and suited to a comparatively dark area of the image, and outputting a second video signal obtained by said second amplification factor;
   first A/D converting means for converting the first video signal into first digital image data corresponding to said first video signal;
   second A/D converting means for converting the second video signal into second digital image data corresponding to said second video signal;
   discriminating means for discriminating a boundary between the comparatively bright area and the comparatively dark area of the image based upon the first digital image data or the second digital image data; and
   synthesizing means for producing composite image data using the first digital image data obtained from said first A/D converting means with regard to the comparatively bright area and the second digital image data obtained from said second A/D converting means with regard to the comparatively dark area, said comparatively bright and dark areas being demarcated by the boundary discriminated by said discriminating means.

15. A still video camera comprising:
   image pick-up means, which includes a solid-state electronic image sensing device, for outputting a video signal, which represents an image obtained by imaging a subject, from said solid-state electronic image sensing device;
   first amplifier means for amplifying the video signal, which is outputted by said image pick-up means, at a first amplification factor suited to a comparatively bright area of the image, and outputting a first video signal obtained by said first amplification factor;
   second amplifier means for amplifying the video signal, which is outputted by said image pick-up means, at a second amplification factor greater than the first amplification factor and suited to a comparatively dark area of the image, and outputting a second video signal obtained by said second amplification factor;
   comparison means for comparing the first video signal with a prescribed threshold level and generating an output when the level of the first video signal exceeds said prescribed threshold level; and
   a multiplexer, to which the first and second video signals are entered, for normally selecting and outputting the second video signal and selecting and outputting the first video signal when an output of said comparator is applied thereto.

16. An image processing apparatus for a still-video camera including image sensing means for outputting one input image signal, comprising:
   amplifying means for producing identical first and second image signals from one input image signal and amplifying at least one of said first and second image signals in conformity with a difference in brightness between a relatively bright area and a relatively dark area of an image represented by the one input image signal; and
   synthesizing means for combining the first image signal and the second image signal, which are obtained from said amplifying means, by adding said first and second image signals at a prescribed ratio.

17. The apparatus according to claim 16, wherein said amplifying means outputs the first image signal as is and outputs the second image signal upon amplifying said second image signal.

18. The apparatus according to claim 16, wherein said amplifying means comprises first and second amplifier means having different amplification factors;
   said first amplifier means amplifying the one input image signal at a first amplification factor to output the first image signal; and
   said second amplifier means amplifying the one input image signal at a second amplification factor larger than the first amplification factor to output the second image signal.

19. The apparatus according to claim 16, further comprising two A/D converters for converting the first and second image signals outputted by said amplifying means into corresponding digital image data, said synthesizing means combining the digital image data obtained from said two A/D converters.

20. The apparatus according to claim 16, wherein the prescribed ratio in said synthesizing means is a fixed value.

21. The apparatus according to claim 16, wherein said synthesizing means comprises varying means for varying said prescribed ratio in dependence upon the level of the first image signal in such a manner that the proportion of the first image signal is enlarged for the relatively bright area and the proportion of the second image signal is enlarged for the relatively dark area.

22. A digital still video camera comprising:
   image pick-up means, which includes a solid-state electronic image sensing device, for outputting a video signal, which represents an image obtained by imaging a subject, from said solid-state electronic image sensing device;
   first amplifier means for amplifying the video signal, which is outputted by said image pick-up means, at a first amplification factor suited to a comparatively bright area of the image, and outputting a first video signal obtained by said first amplification factor;

second amplifier means for amplifying the video signal, which is outputted by said image pick-up means, at a second amplification factor greater than the first amplification factor and suited to a comparatively dark area of the image, and outputting a second video signal obtained by said second amplification factor;

first A/D converting means for converting the first video signal into first digital image data corresponding to said first video signal;

second A/D converting means for converting the second video signal into second digital image data corresponding to said second video signal; and synthesizing means for combining the first digital image data and the second digital image data by adding the first and second digital image data at a prescribed ratio.

23. An image processing method comprising the steps of:

producing identical first and second image signals from one input image signal;

amplifying at least one of the first and second image signals in conformity with a difference in brightness between a relatively bright area and a relatively dark area of an image represented by the one input image signal;

finding a boundary between the relatively bright area and the relatively dark area of the image; and producing a composite image signal using the first image signal with regard to the relatively bright area and the second image signal with regard to the relatively dark area, said relatively bright and dark areas being demarcated by the boundary found.

24. An image processing method for a still-video camera comprising the steps of:

producing identical first and second image signals from one input image signal;

amplifying at least one of the first and second image signals in conformity with a difference in brightness between a relatively bright area and a relatively dark area of an image represented by the one input image signal; and combining the first image signal and the second image signal at a prescribed ratio.

* * * * *